United States Patent [19]
Kenny et al.

[11] Patent Number: 5,983,355
[45] Date of Patent: *Nov. 9, 1999

[54] POWER CONSERVATION METHOD AND APPARATUS ACTIVATED BY DETECTING SPECIFIC FIXED INTERRUPT SIGNALS INDICATIVE OF SYSTEM INACTIVITY AND EXCLUDING PREFETCHED SIGNALS

[75] Inventors: John D. Kenny, Sunnyvale; Emilia Lei, Fremont; Vimi Pandey, Santa Clara, all of Calif.

[73] Assignee: National Semiconductor Corporation, Santa Clara, Calif.

[ * ] Notice: This patent is subject to a terminal disclaimer.

[21] Appl. No.: 08/650,355

[22] Filed: May 20, 1996

[51] Int. Cl.⁶ .................................................. G06F 1/00
[52] U.S. Cl. ........................................ 713/322; 713/320
[58] Field of Search ................................ 395/750, 580, 395/584, 586, 588; 364/707

[56] References Cited

U.S. PATENT DOCUMENTS

| | | | |
|---|---|---|---|
| 4,851,987 | 7/1989 | Day | 364/200 |
| 5,189,647 | 2/1993 | Suzuki et al. . | |
| 5,218,704 | 6/1993 | Watts, Jr. et al. | 395/750 |
| 5,222,239 | 6/1993 | Rosch | 395/750 |
| 5,237,692 | 8/1993 | Raasch et al. . | |
| 5,239,652 | 8/1993 | Seibert et al. . | |
| 5,317,752 | 5/1994 | Jewett et al. . | |
| 5,377,336 | 12/1994 | Eickmeyer et al. | 395/375 |
| 5,386,552 | 1/1995 | Garney . | |
| 5,392,435 | 2/1995 | Masui et al. . | |
| 5,396,635 | 3/1995 | Fung | 395/800 |
| 5,404,546 | 4/1995 | Stewart | 395/750 |
| 5,410,714 | 4/1995 | Yorimoto et al. . | |
| 5,414,860 | 5/1995 | Canova, Jr. et al. . | |
| 5,475,848 | 12/1995 | Ikeda | 395/750 |
| 5,511,203 | 4/1996 | Wisor et al. | 395/750 |
| 5,546,037 | 8/1996 | Kenny et al. | 327/230 |
| 5,546,568 | 8/1996 | Bland et al. | 395/550 |
| 5,548,763 | 8/1996 | Combs et al. | 395/750 |
| 5,560,017 | 9/1996 | Barrett et al. | 395/733 |
| 5,560,024 | 9/1996 | Harper et al. | 395/750 |
| 5,590,342 | 12/1996 | Marisetty | 395/750 |

FOREIGN PATENT DOCUMENTS 0 656 579 A2  6/1995  European Pat. Off. .

OTHER PUBLICATIONS

Pico¦Power A Cirrus Logic Division, VESUVIUS–LS, Pentium Processor PCI System Controller, Preliminary Data Book, Version 0.7, Sep. 1995.

"Pico Power VESIVOIS–LS Preliminary Data Book", National Semiconductor, version 1.0, pp. ii–xii, 1–32–1–34, 1–60–1–77,1–130–1–210,3–320–3–343, Mar. 1996.

Cirrus Logic, Inc., *VESUVIUS–LS Advanced Data Book Version 0.6;* 3/95; pp. 54–67.

Shanley and Anderson; *ISA System Architecture;* pp. 331–366; MindShare, Inc.; 1991 and 1993.

*Primary Examiner*—Ayaz R. Sheikh
*Assistant Examiner*—Jigar Parcholi
*Attorney, Agent, or Firm*—Limbach & Limbach, L.L.P.

[57] ABSTRACT

A method and apparatus is disclosed for controlling the application of a clock stopping signal in a processor to limit power consumption. The system controller receives addresses, signals indicative of primary and secondary system activity, and at least one nap timeout signal. Addresses are compared with fixed software interrupt addresses. Matching non-prefetched addresses trigger a nap mode. Upon nap mode triggering, the clock stopping signal may be throttled until a programmable NAP timer expires. Applying the clock stopping signal with programmable duty cycle during the throttling period ensures that processing necessary for the detection and servicing of primary and secondary activity may occur. A prefetch detect circuit ensures that fixed software interrupt addresses loaded in the middle of a prefetch do not trigger the clock stopping signal. The clock stopping signal is removed or inhibited when primary or secondary activity is detected or when a nap mode is terminated by a nap timer timing out.

26 Claims, 10 Drawing Sheets

POWER CONSERVATION METHOD AND APPARATUS ACTIVATED BY DETECTING SPECIFIC FIXED INTERRUPT SIGNALS INDICATIVE OF SYSTEM INACTIVITY AND EXCLUDING PREFETCHED SIGNALS

CROSS-REFERENCE TO RELATED APPLICATIONS

The present application is related to commonly-assigned and co-pending application Ser. No. 08/649,557, filed May 17, 1996, titled "METHOD AND APPARATUS FOR CONSERVING POWER IN A COMPUTER SYSTEM BY CONTROLLING A CLOCK STOPPING SIGNAL."

FIELD OF THE INVENTION

The present invention relates to personal computer power conservation and management and relates to a method and apparatus for controlling application of a clock stopping signal to a processor to conserve power.

BACKGROUND OF THE INVENTION

Proliferation of portable personal computers and increasing public awareness of practical and environmental issues related to energy conservation may create a demand to conserve power in computing devices. For portable computers, thermal management and battery longevity concerns drive power conservation efforts. In desktop computing devices, power conservation relates to conserving natural resources in keeping with government and industry standards such as the EPA's EnergyStar standard.

Portable computers may only be useful if battery life supports a reasonable period of use between charges. Sufficient periods of time may be necessary to allow users to complete lengthy tasks or series of tasks. Modem portable computer batteries, even when rated for eight hours of use, may have lives of only about two or three hours between charges when continuously running CPU intensive tasks. Additional concerns regarding thermal runaway may be compounded in a high clock speed environment during extended periods of heavy processing loads.

Clock speed is known in the art to have a direct relationship to power consumption. Lee, et al., U.S. Pat. No. 5,254,888, issued on Oct. 19, 1993 and incorporated herein by reference discloses an Intel 486 CPU operating at 33 MHz may dissipate about 4 watts of power. Lee, et al. discloses a technique for saving power by slowing the clock during wait states. However, the technique disclosed in Lee does not appear to accomplish selective application of a clock stopping signal within programmed intervals while the system may be in one of several power conservation modes.

Modem operating environments such as Microsoft® Windows® with graphical user interfaces (GUI), even when idle, may require more processing from the CPU than non-GUI based operating systems. Thus, a portable computer which is running a GUI based operating system may experience shorter battery life when idle than its idle non-GUI counter part. Other system components such as displays, disk drives, and keyboards consume system power when accessing processor resources. Reducing power consumed by these system components while maintaining the ability to monitor their activity and provide them with processing resources without delay may be desirable.

Prior art power conservation methods such as sleep modes which disable the processor more completely, may have the disadvantage of long wake-up latencies. Service to system peripherals may not be possible until full processor wake-up. Providing system peripherals with faster access to processor service may shorten wake-up latency. Shortening wake-up latency may translate to more tolerable wait times for the user as the system wakes up. Moreover, some processing requests may be serviced in the background without requiring full wake-up. By making it possible for some activity to be processed during sleep modes, a wider array of activity may be available to trigger wake-up.

Interrupts are known in the art and may be generated when system activity is present either from user input or from peripherals which require processor service. Peripheral devices may request service from a processor through an interrupt request. Interrupt requests may be serviced through the execution of an Interrupt Service Routine (ISR). When an interrupt occurs, the processor stops executing a present program and begins executing the ISR as discussed in Chapter 18, pp 331–366, *ISA System Architecture,* Shanley and Anderson, MindShare Press, 1991, 1993, incorporated herein by reference. The processor may respond to an interrupt request and determine which device or software process initiated the request by obtaining the associated interrupt number. Once the identity of the interrupt is determined by interrupt number, the address of the ISR may be found from the interrupt vector table (IVT) and the ISR executed. When the ISR is finished executing, execution may resume at the location stored when the processor was interrupted.

Interrupts may be generated from system activity related to keyboard input, disk drive access, peripheral access, and other system events. Conversely, other interrupts may be indicative of system inactivity. ISRs for software interrupts may be programmed into BIOS ROM and loaded into corresponding interrupt number entries in the IVT at startup. The IVT may reside in the real mode address space 00000H to 003FFH. In protected mode, the IVT can be relocated anywhere in memory.

Common DOS fixed software interrupt INT16H, for example, is well known. Interrupt INT16H, known as the Keyboard Services interrupt is described in *The Programmer's PC Sourcebook,* 2nd Ed., Tom Hogan, Microsoft Press, 1991, incorporated herein by reference. When there is no input from a user, DOS may loop on INT16H looking for keyboard activity. Detecting such system looping on INT16H in itself may be used to trigger sleep modes. Subsequent activity may trigger a system to wake up. However, as described earlier, an often prolonged period must be endured for the system to wake-up in order to begin or resume a task. Then, when processing is restored, all processing resources may be available.

Such an approach may be inefficient since a demand for immediate processing may be present once wake-up activity is detected by the wake-up event itself. Other system events or activity may demand immediate processing but for a short period of time, while still other system events or activity may call for processing of a background nature. Moreover, there may be small intervals between events too small to activate sleep modes but susceptible to being used to achieve a power savings. During such relatively short time intervals where full processor resources may be available, there may not be a corresponding need for processing.

SUMMARY OF THE INVENTION

To overcome the limitations of the prior art, the present invention is embodied in a system controller disposed within a computer system which receives signals including address signals, signals indicative of system activity, and at least one nap timeout signal. Addresses which match fixed software interrupt trigger the generation of a nap signal. The nap signal may be applied to a stop clock state machine which generates a clock stopping signal. The clock stopping signal is applied to the processor to suspend processing. A plurality of mode timers determine when the computer system may be advanced to a progressively lower power mode. A signal indicative of system activity may be applied to the logic circuit resulting in the de-assertion of the nap signal in one of at least two modes. De-assertion of the nap signal results in the clock stopping signal being removed. Full speed processing resumes upon removal of the clock stopping signal in certain instances.

In the preferred embodiment of the present invention, a prefetch detect circuit may generate a prefetch detect signal if the present address decoded from the bus is offset by one from the previous address stored in a register. When prefetching, the processor may read a predetermined amount of information from contiguous, sequential locations in memory. Sequential memory locations may have the characteristic of being addressed with values one greater than the previous address corresponding to an eight-byte boundary on a Pentium™ processor. Such an intrinsic characteristic may be an indication that the processor is prefetching rather than executing.

Information accessed during prefetch may be called a prefetch line. The length of a prefetch line may vary arbitrarily and may be subject to addressing limitations. In the present embodiment the prefetch line may be thirty-two bytes. If an interrupt address match is found within the first eight bytes of a prefetch line, as determined by its presence within the prefetch detect circuit as either the present address or the previous address, a prefetch detect signal may be generated. As each new address appears on the address bus, the present address may be stored in a register and may become the previous address for comparison purposes during the next cycle. When the present address is equal to the previous address plus one, a prefetch detect signal may be generated and applied to a logic circuit which inhibits the generation of the nap signal. For systems with an installed Pentium™ processor, bits 31 through 3 may be used to compare the present address and the previous address. Interrupt addresses within a prefetched line may be prevented from asserting the nap signal during prefetches and degrading performance through false nap triggering. Legitimate interrupts may cause the processor to store the present value of the instruction pointer and jump to the address stored in the interrupt vector table. Once execution begins at the new address prefetching may be resumed. Once prefetching resumes after such an interrupt, the interrupt vector address may be the first address in the new prefetch sequence.

Also within the preferred embodiment, a throttling circuit, which may be selectively enabled, controls the application of the clock stopping signal during a throttling period. A value corresponding to the duration of a throttling period may be stored in a register coupled to the throttling circuit. The clock stopping signal of a particular duty cycle may be applied during the throttling period. A value corresponding to the percent duty cycle of the clock stopping signal may be stored in another register also coupled to the throttling circuit. The clock stopping signal may also be applied continuously in response to a nap trigger if throttling is disabled.

As described, interrupts may be generated when system activity is present either from user input or from peripherals which require processor service. System activity may be characterized more specifically in the present invention as primary activity, secondary activity, and so on. System activity may occur during the throttling period. The occurrence of system activity may cause the system to return instantly to a fully-on mode. System activity may further cause the processor to service the activity and return the system to the previous power conservation mode upon completion of service. Applying the clock stopping signal in a periodic manner during throttling ensures that detection of system activity may not be degraded and that a predetermined amount of processing may be sustained during the nap period. Throttling may minimize performance degradation and maximize power conservation during periods with no activity where continued processing is desirable. A plurality of power conservation modes allow a system to return instantly to processing. The power management modes may include Fully-On, Conserve, Doze, Sleep, Deep-Sleep, Suspend, or the like.

BRIEF DESCRIPTIONS OF THE DRAWINGS

FIG. 2b is a timing diagram illustrating timing of signals within the throttling circuit of FIG. 2a.

FIG. 3b is a timing diagram illustrating the timing of the overall circuit of FIG. 3a.

FIG. 3c is a state machine diagram illustrating the state transitions of the prefetch detect circuit of FIG. 3a.

FIG. 3d is a logic diagram illustrating the prefetch detect circuit of FIG. 3a.

FIG. 3e is a timing diagram illustrating the prefetch detect circuit of FIG. 3a.

DETAILED DESCRIPTION OF THE INVENTION

The descriptions herein are by way of example only illustrating the preferred embodiment of the present invention. However, it should be appreciated that the method and apparatus of the present invention may be applied in a similar manner in other embodiments without departing from the spirit of the invention.

In general, the present invention conserves power in a personal computer system while allowing a plurality of system events to be detected and serviced. Events may be categorized as primary events, secondary events and so on allowing special power conservation modes to be invoked depending on activity type. In the present invention, a plurality of power conservation modes may be progressively achieved in the absence of activity as respective mode timers expire. Upon detection of certain system events, full or partial wake-up may be triggered in order to perform necessary processing. If the system is already in a fully-on mode, and there is no system activity, a nap mode may be triggered by the occurrence of fixed software interrupts indicative of system inactivity.

Figure 1:
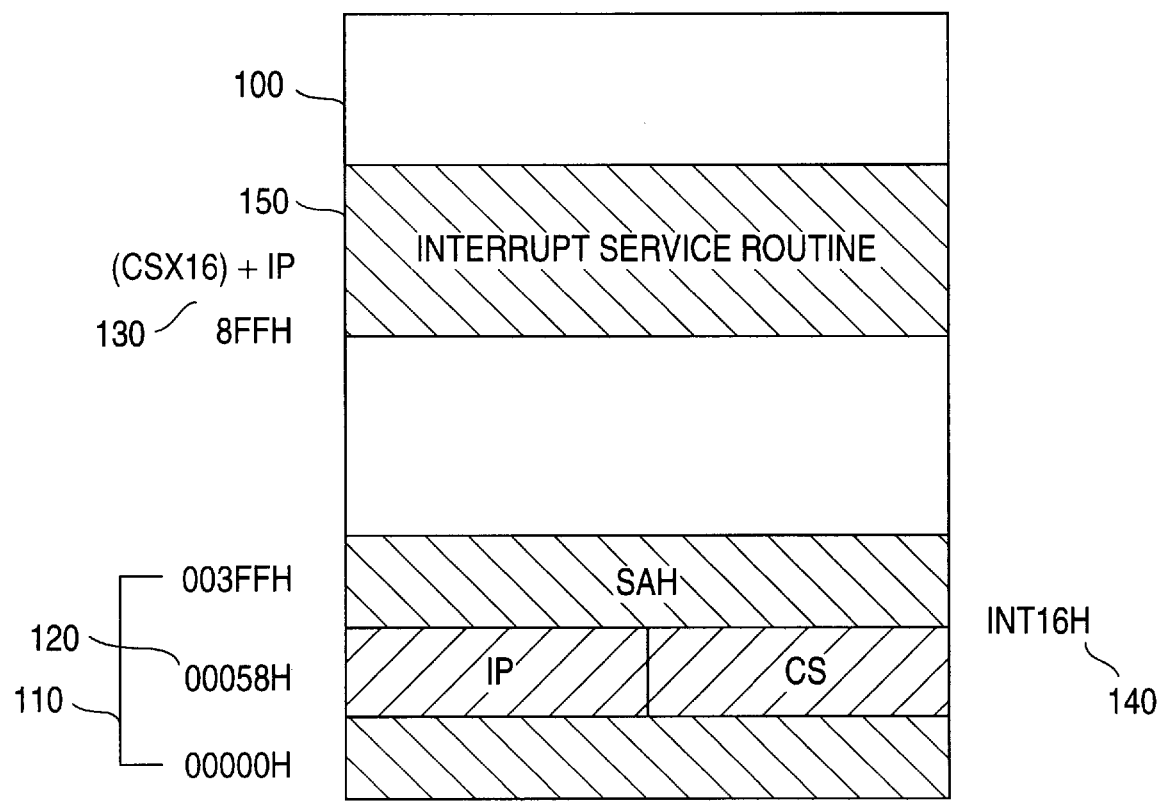
FIG. 1 is a diagram of system memory illustrating an interrupt vector table, an interrupt number entry, and an interrupt service routine.

FIG. 1 illustrates an example of interrupt vector table located in address space 110 in memory area 100. When the computer system of the present invention begins execution from power-on, ISR addresses for common software interrupts may be loaded into interrupt table addresses according to respective interrupt numbers. The ISR addresses corresponding to interrupt numbers may be loaded into address space 110 from 00000H to 003FFH by BIOS startup routines. Interrupt entry 140 may correspond to interrupt number INT16H. Interrupt entry address 120 for interrupt entry 140 may be 00058H. Interrupt entry address 120 may be calculated by multiplying an interrupt number, such as INT16H, by four. The number four may correspond to the number of bytes which form the ISR address in Code Segment (CS) plus Instruction Pointer (IP) form which may be commonly referred to as segment plus offset form. The two most significant bytes at interrupt address 120 may represent the CS value. The two least significant bytes may represent the IP value. For example, interrupt 140 corresponds to INT16H. Sixteen may be multiplied by four and converted into hexadecimal to calculate an interrupt table address 120 of 00058H. In the preferred embodiment, interrupt address 120 may contain a CS and IP value. Whenever address 58H is read during an INT16H, nap triggering may occur.

The four bytes of address 120 may comprise the CS and IP values used to form an address of ISR 150. ISR 150 may be executed as part of a CPU INT cycle whenever INT16H is identified as a present interrupt number. ISR 150 located at ISR address 130 may be calculated by multiplying the CS value read from the third and fourth bytes of interrupt address 120 by sixteen then adding the IP value obtained from the first and second bytes of interrupt address 120. As described earlier, ISR 150 may be loaded during startup at ISR address 130 by BIOS for common software interrupts. ISR 150 may also be loaded by an application or other software. Loading ISR 150 allows a custom ISR for a particular interrupt number to replace a standard ISR. Other ISRs may be loaded at other addresses and these ISR addresses loaded in the interrupt vector table in a corresponding interrupt number address by BIOS at startup, an application, or other software when hooking an unused interrupt or a fixed interrupt.

Figure 2A:
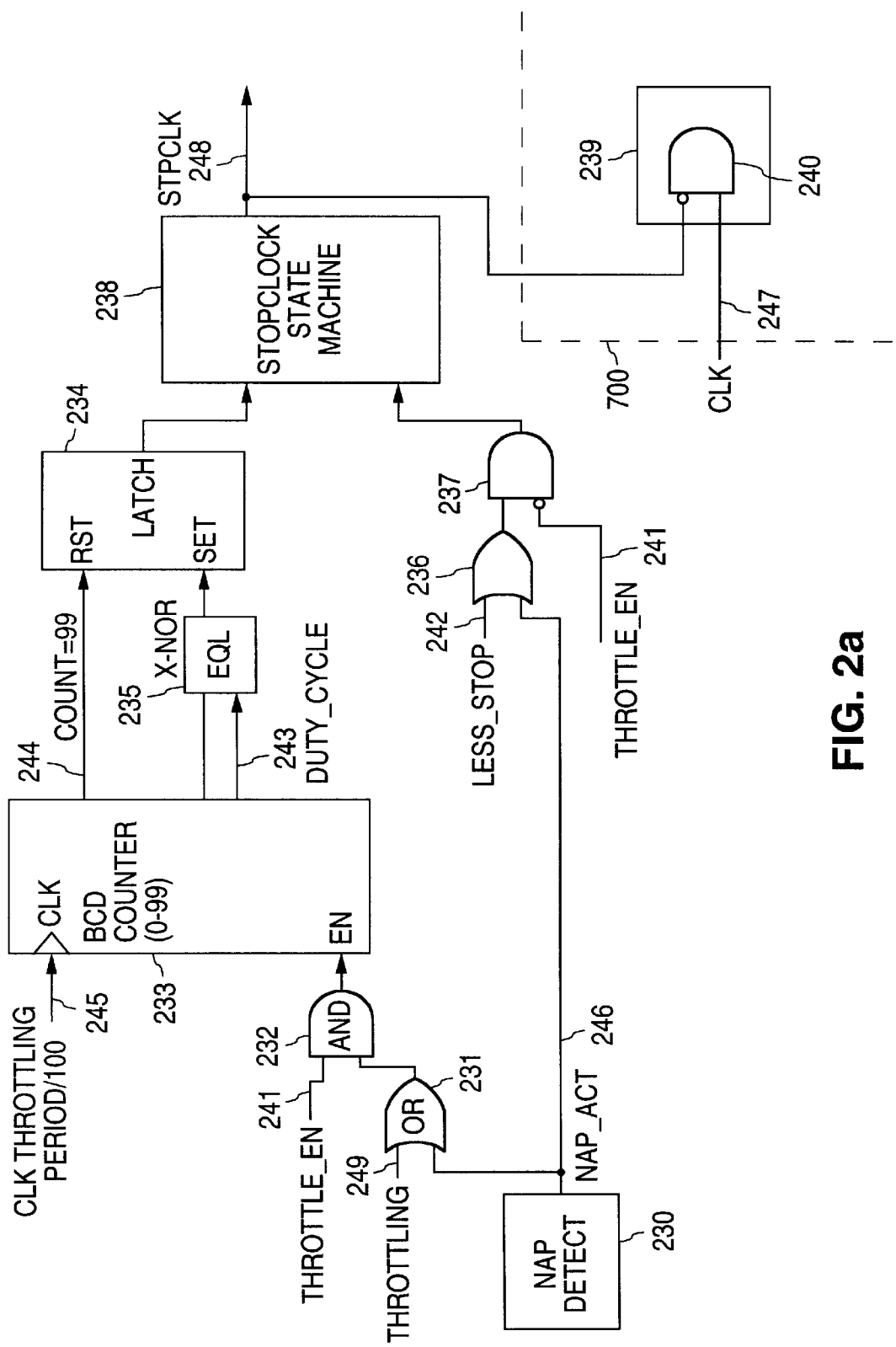
FIG. 2a is a logic diagram illustrating a portion of the throttling circuit.

FIG. 2a is a logic diagram illustrating a portion of the throttling circuit. CLK THROTTLING PERIOD/100 245 may be stored in and read from a register and input to counter 233. NAP DETECT circuit 230 may generate NAP_ACT signal 246 in response to a nap triggering event. NAP_ACT signal 246 may be input to OR gate 231 and OR gate 236. THROTTLING signal 249 may be input to OR gate 231 with NAP_ACT signal 246. The logical output of OR gate 231 may be input to AND gate 232 with THROTTLE_EN signal 241 which may be used to enable or disable throttling. The logical output of AND gate 232 may be input as an enable to counter 233. When a count of 99 is reached, COUNT output 244 may be generated and input to the reset pin of latch 234. Duty cycle 243 may be input to gate 235 which may be implemented as an XNOR gate and input to the set pin of latch 234. The output of latch 234 may be input to STOPCLOCK STATE MACHINE whose configuration is known in the art and may be used to control throttling of STPCLK signal 248. LESS_STOP signal 242 indicative of a requirement for continued assertion of STPCLK signal 248 may be input to logic gate 236 along with NAP_ACT signal 246. Logical output of logic gate 236 may be input to logic gate 237. THROTTLE_EN signal 241 may be input to logic gate 237 and logical output applied to the STOPCLOCK STATE MACHINE to control continued assertion of STPCLK signal 248. STPCLK signal 248 may be input to clock stopping circuit 239 inside CPU 700 and in conjunction with CPUCLK signal 247 may be applied to gate 240 shown here as an AND gate to stop the internal clock in CPU 700, thus reducing the power consumed by CPU 700.

Figure 2B:
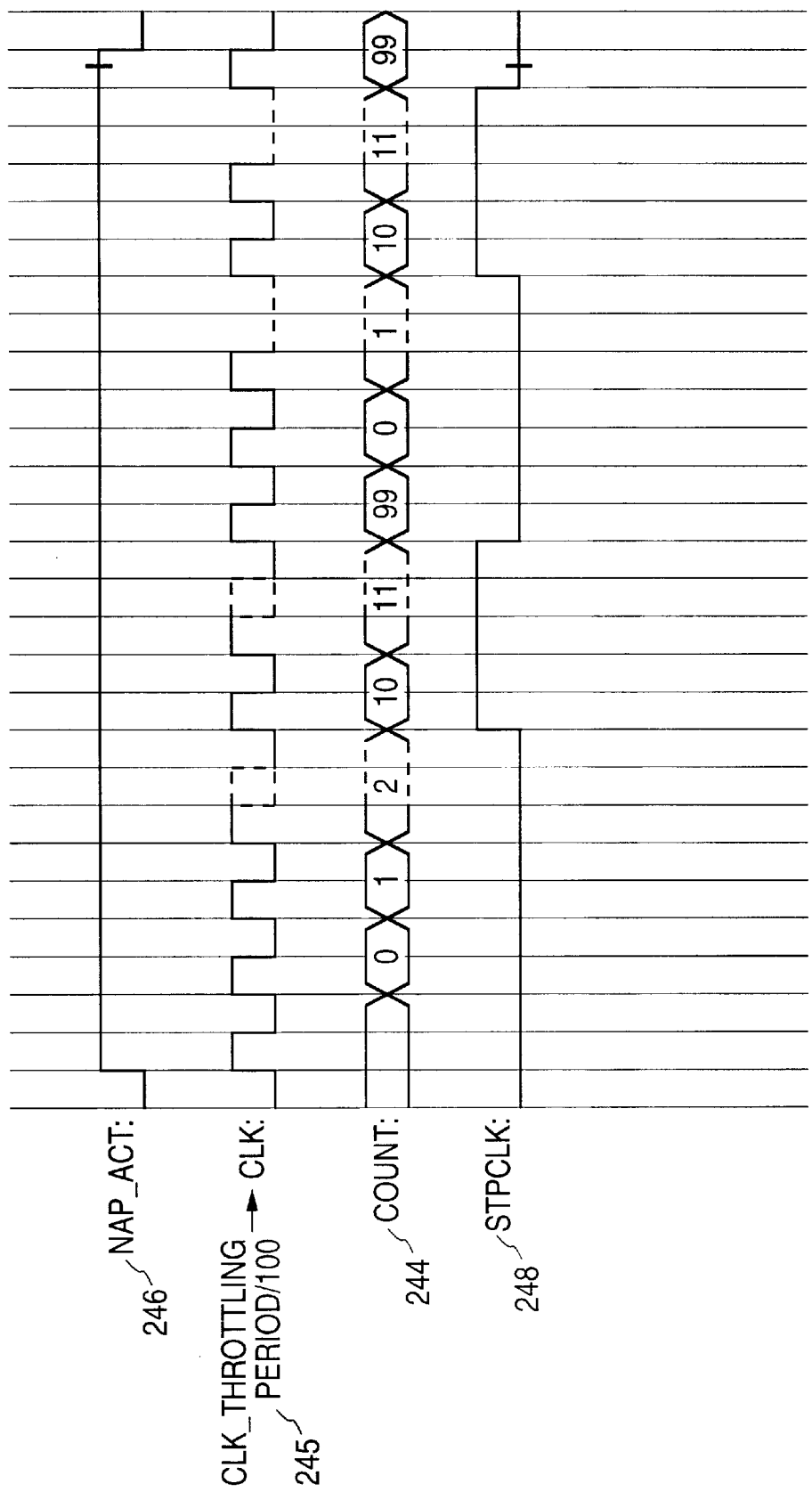

FIG. 2b is a timing diagram illustrating timing of signals within the throttling circuit of FIG. 2a. NAP_ACT signal 246 may be generated in response to nap triggering activity and, when active, may be used to activate clock stopping circuitry. CLK_THROTTLING PERIOD/100 signal 245 may be used as a counter clock signal to drive the throttled STPCLK signal 248 input to the STOPCLOCK STATE MACHINE 238. COUNT signal 244 may be generated for every count up to a count up value. In the preferred embodiment the count may be 99. If the duty cycle register is set to 10, the STPCLK signal 248 may be generated on the 10th cycle of COUNT and be reset on the 99th cycle of COUNT. STPCLK signal 248 may be used to activate a clock stopping circuit.

Figure 3A:
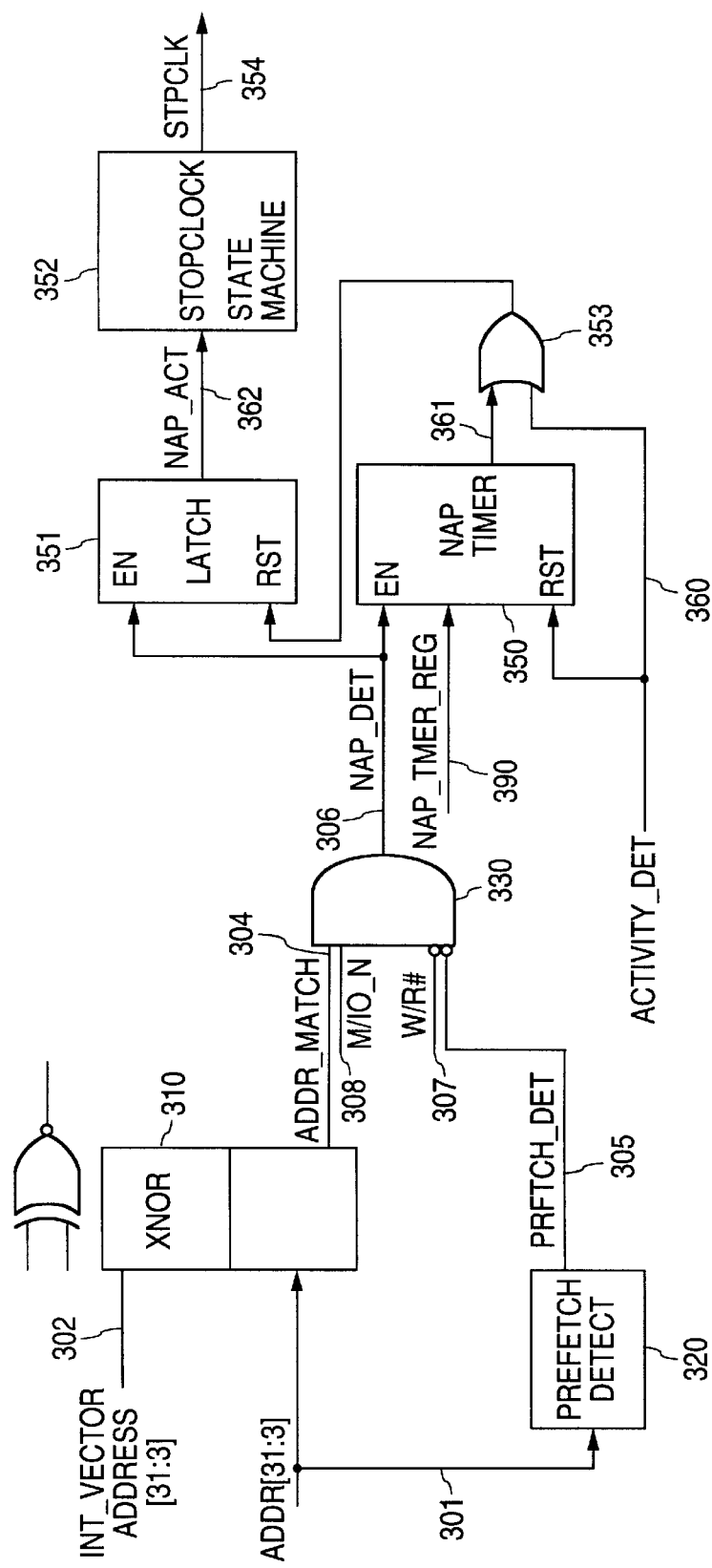
FIG. 3a is a logic diagram illustrating the throttling circuit, prefetch detect circuit, and the nap detect circuit of the present invention.

FIG. 3a is a logic diagram illustrating the throttling circuit, prefetch detect circuit, and the nap detect circuit of the present invention. INT_VECTOR_ADDRESS[31:3] 302 may be input to comparison block 310 shown as an XNOR gate. ADDR[31:3] 301 may be input to XNOR block 310 and PREFETCH DETECT circuit 320. XNOR block 310 may generate ADDR_MATCH signal 304 if ADDR [31:3] 301 matches INT_VECTOR_ADDRESS[31:3] 302 and output ADDR_MATCH signal 304 to gate 330. A high M/IO_N signal 308 indicative of memory access may be input to gate 330. A low W/R_N signal 307 indicative of a memory read access may be input to gate 330. PRFTCH_DET signal 305 generated in PREFETCH_DETECT circuit 320 in response to detecting prefetches, may be inverted and input to gate 330. NAP_DET may be generated as the logical output of gate 330 indicating that all the inputs necessary for activating a nap mode are present. NAP_DET signal 306 may be input to latch 351 and NAP TIMER 350. ACTIVITY DET signal 360 may be generated in response to the presence of primary or secondary activity and may be input to NAP TIMER 350 and gate 353. When a nap event is detected and NAP_DET signal is generated and output to latch 351, NAP_ACT signal 362 may be generated unless a reset signal is generated from gate 353. Gate 353 may generate a reset signal to latch 351 when ACTIVITY_DET signal 360 is present or when NAP TIMER 350 times out after counting to a value programmed in the NAP_TIMER_REG 390. Otherwise, NAP_ACT signal 362 may be generated and output to STOPCLOCK STATE MACHINE 352 whose configuration is known in the art. STOPCLOCK STATE MACHINE may then generate clock stopping signal STPCLK signal 354.

Figure 3B:
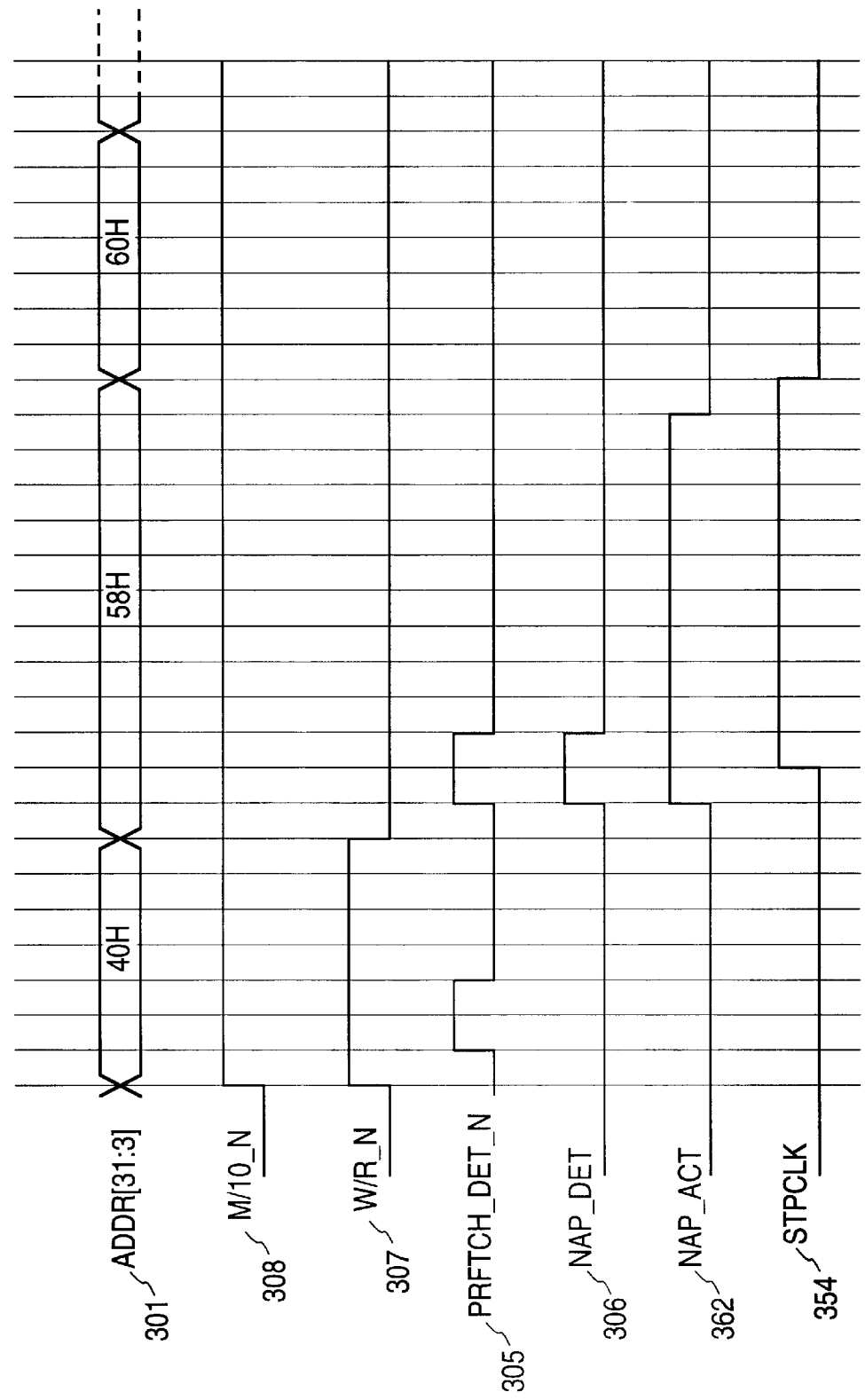

FIG. 3b is a timing diagram illustrating the timing of the overall circuit of FIG. 3a. ADDR[31:3] signal 301 represents the present address and may be input to XNOR gate 310 of FIG. 3a. M/IO_N signal 308 may be indicative of memory access and may be active high as shown indicating active memory access during prefetch detection. W/R_N signal 307 may be indicative of whether access is read or write access and may be active low as shown during prefetch detection indicating that read access is in progress. PRFTCH_DET signal 305 may be indicative of a prefetch condition and may be low as shown indicating that the current memory access is not part of a prefetch. NAP_DET signal 306 may be generated in response to a nap triggering event and may be active high as shown indicating that a triggering event has occurred. NAP_ACT signal 362 may be generated during the napping interval and may be active high as shown indicating that the napping interval is occurring. STPCLK signal 354 may be generated during the napping interval and may be active high as shown indicating that clock stopping may occur while NAP_ACT signal 362 is active.

Figure 3C:
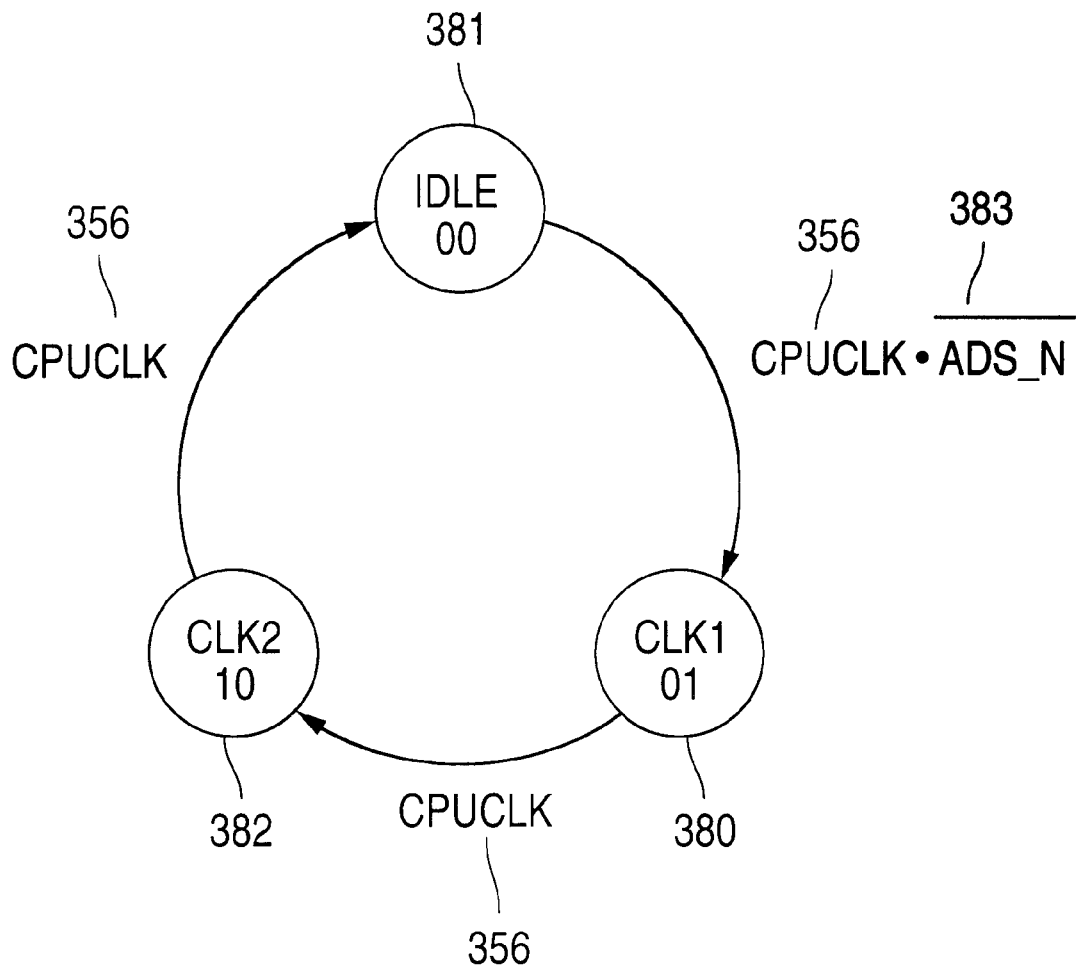
Figure 3D:
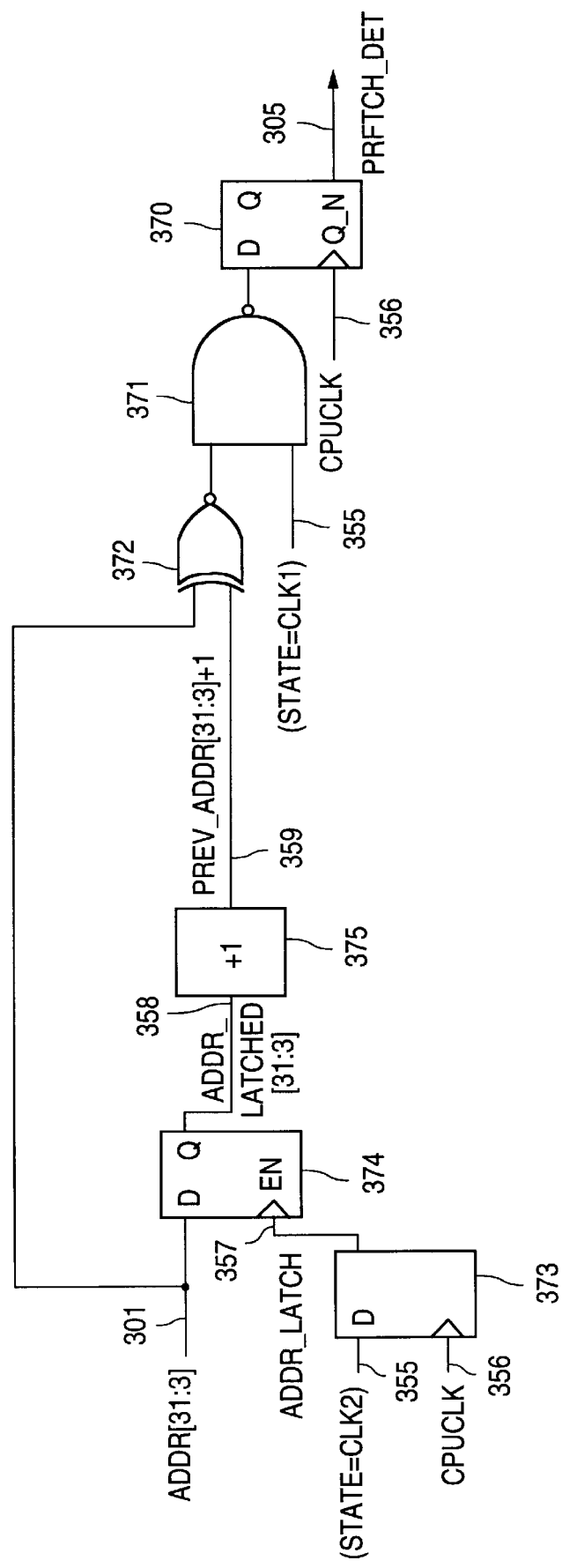

FIG. 3c is a state machine diagram illustrating the state transitions of the prefetch detect circuit of FIG. 3a. Prefetch detect state machine may begin cycling at IDLE state 00, 381. From IDLE state 00, 381 a CPUCLK 356 transition coupled with an active low ADS_N signal 383 may cause a transition to CLK1 state 01, 380 where a signal indicating a match between the present address and the previous address may be gated through to the output as illustrated in FIG. 3d. Upon a transition of CPUCLK 356, CLK2 state 10, 382 may be transitioned to. In CLK2 state 10, 382, the present address may be clocked into the prefetch detect circuit as illustrated in FIG. 3d. A final transition of CPUCLK 356 may cause the state machine to transition back to IDLE state 00, 381.

FIG. 3d is a logic diagram illustrating the prefetch detect circuit of FIG. 3a. ADDR[31:3] signal 301 may represent the present address in terms of the 29 most significant bits and may be input to logic gate 372 and the D input of latch 374. STATE 355 and CPUCLK 356 may be input to latch 373. Flip-flop 373 may be used to generate ADDR_LATCH signal 357 when STATE 355 equals CLK2. ADDR_LATCH signal 357 may be input to the enable pin of latch 374. Enabling latch 374 allows ADDR[31:3] 301 to be latched into latch 374. ADDR_LATCHED signal 358 may be output from latch 374 in a subsequent clock cycle. ADDR_LATCHED signal 358 represents the previous address and may be input to block 375 where a value of one is added to generate PREV_ADDR[31:3]+1 signal 359. PREV_ADDR[31:3]+1 signal 359 may be input to gate 372 and along with ADDR[31:3] signal 301 and may be used to generate logical output to gate 371 when ADDR[31:3] signal 301 matches PREV_ADDR[31:3]+1 signal 359. Logical output of gate 371 may be input to the D input of latch 370 and CPUCLK 356 may be input to the enable input of latch 370. If a logical output from gate 371 is present, and CPUCLK 356 is present then PRFTCH_DET 305 may be generated and output at the Q_N output of latch 370. PRFTCH_DET 305 may then be used to inhibit nap triggering.

Figure 3E:
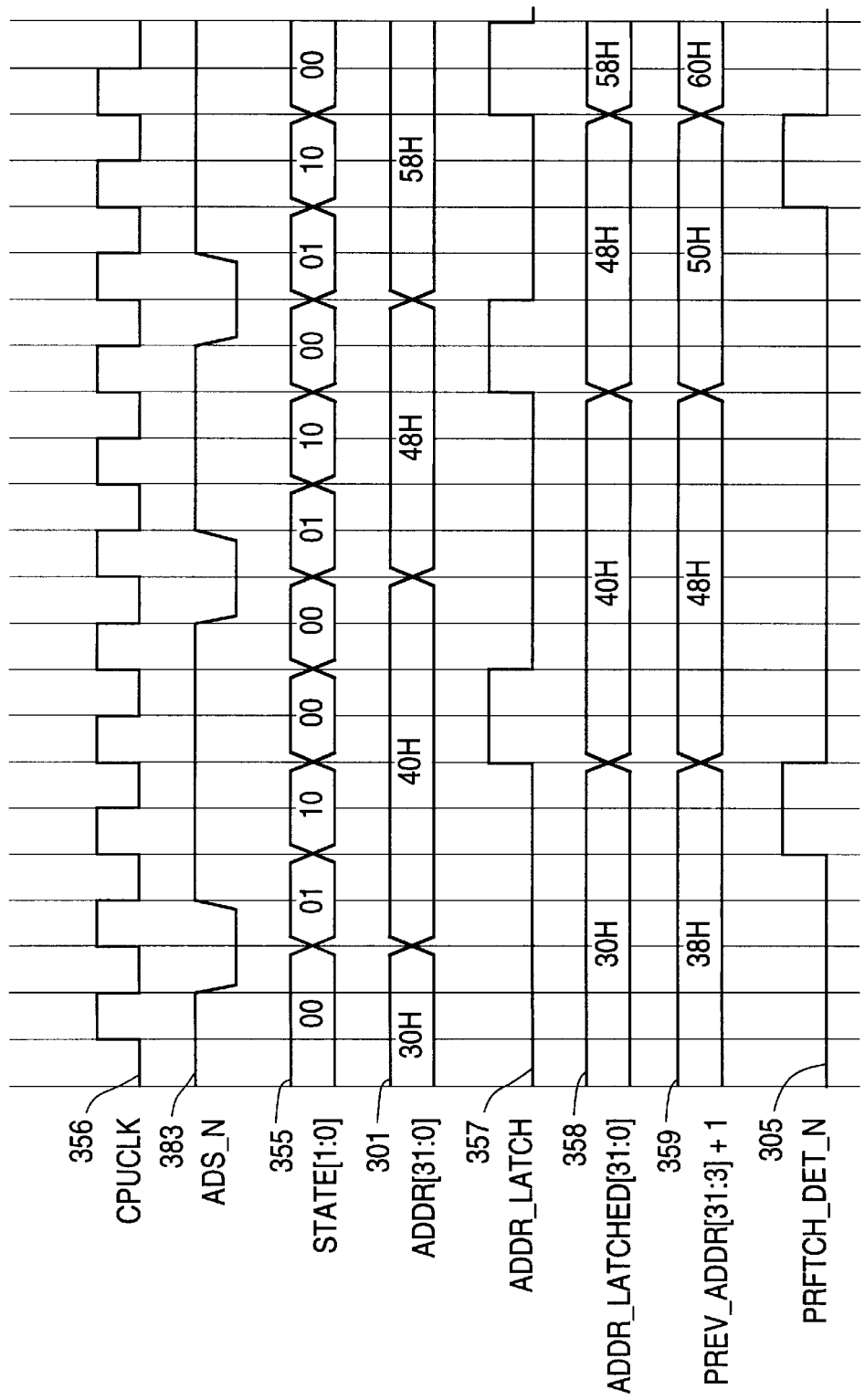

FIG. 3e is a timing diagram illustrating the prefetch detect circuit of FIG. 3a. CPUCLK 356 may be used to synchronize the operation of the prefetch detection circuit with the operation of the system. ADS_N 383 may be used to indicate when the address is a valid address. STATE[1:0] 355 may represent the present state of the prefetch detect state machine. ADDR[31:3] 301 may represent an address presently on the system bus and may be used to monitor for a match between an address presently on the system bus and a predetermined nap triggering address or used to determine whether ADDR[31:0] 301 is a prefetched address. ADDR_LATCH signal 357 may be used to latch ADDR[31:0] 301 into a latch where it may be used to determine whether a subsequent value of ADDR[31:0] 301 is a prefetched address. ADDR_LATCHED [31:0] 358 may represent the value of the address latched and may be used to generate PREV_ADDR[31:3]+1 359 which may represent the value of ADDR_LATCHED 358 plus 1. The significance of adding one to the value of ADDR_LATCHED 358 to form PREV_ADDR[31:3]+1 is by adding one, a subsequent comparison with ADDR[31:3] 301 which may represent the address presently on the system bus, will yield a match if ADDR[31:3] is a prefetched address. Prefetched addresses are tacitly read from sequential memory locations and thus are offset from each other by a value of one.

Figure 4:
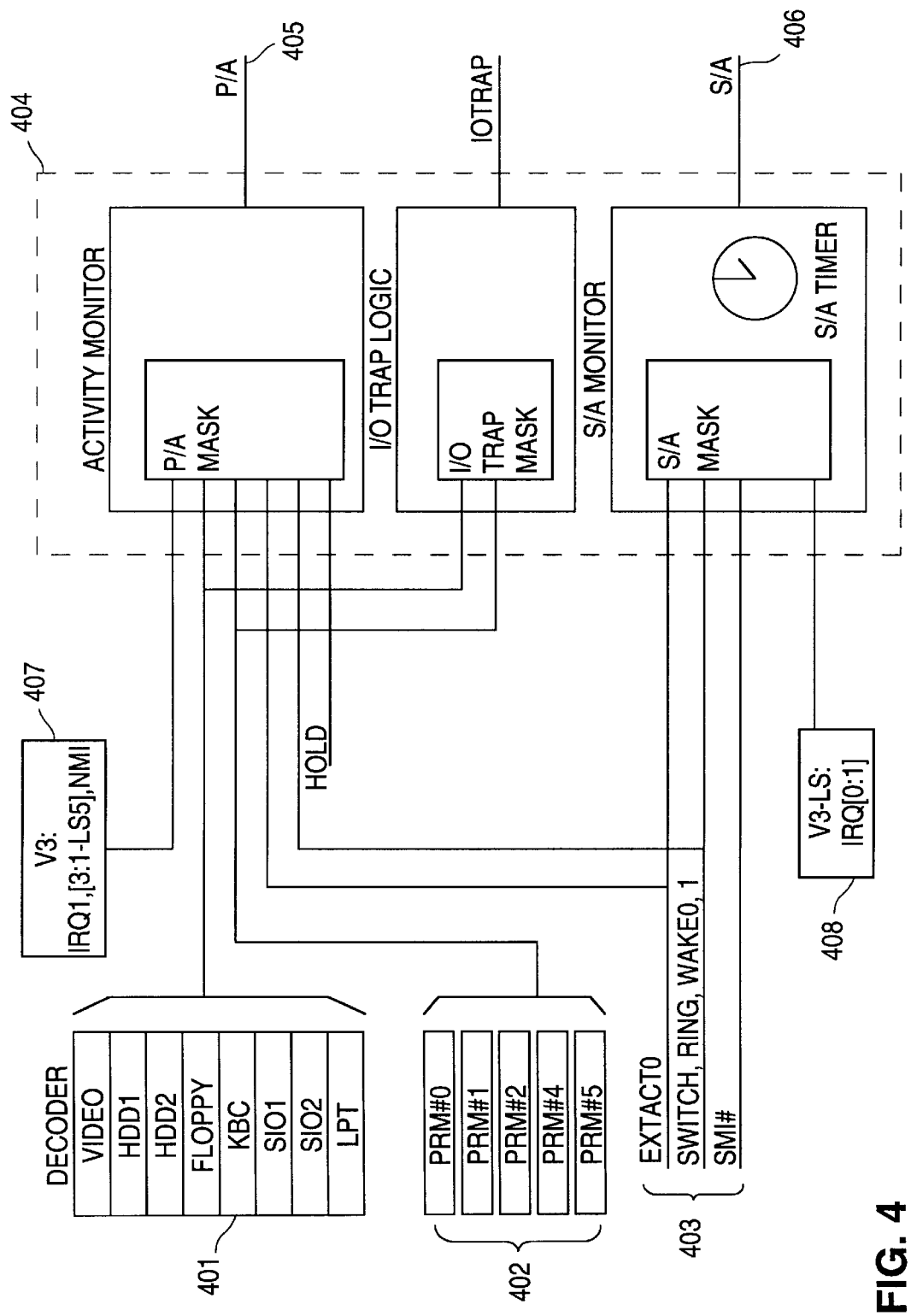
FIG. 4 is a block diagram illustrating primary and secondary activity generation.

In the preferred embodiment, ACTIVITY_DET 360 which may comprise primary and secondary activity, may be used to inhibit nap triggering, or end nap mode as illustrated in FIG. 3a. Primary activity may be defined as important system activity where system resources may be being accessed. Unless masked, any primary activity may bring the system into filly awake mode. Primary activity may also reset power management timers. FIG. 4 illustrates primary activity register bank 402 comprising PRM#0 through PRM#5. Any read or write accesses to addresses matching those stored in these registers may trigger the generation of primary activity, P/A signal 405. Accesses to VIDEO, hard drive or any of the devices shown in device register bank 401 may trigger the generation of P/A signal 405 as may the occurrence of any unmasked interrupt requests as in IRQ block 407.

Secondary activity may be defined as requiring a short amount of service time during various levels of inactivity. Unless masked, secondary activity may cause the secondary event to be processed at full speed without throttling enabled. When the secondary event is serviced, the system may return to whatever mode the system was in prior to the occurrence of the secondary activity. Secondary events 403 comprise EXACT0, SWITCH, RING, WAKE0 and 1, and SMI#s. These events are described in the *VESUVIUS-LS PCI System Controller Advance Data Book*, Version 0.6 March 1995, PICOPOWER a Cirrus Logic Company, p.54–67 incorporated herein by reference.

In addition to secondary events 403, secondary activity may be triggered by IRQ block 408. System Management Interrupts, SMI#s of secondary events 403 may allow activity to be programmed to trigger S/A signal 406 indicative of secondary activity. At least six device timers and at least three mode timers also may trigger S/A signal 406 through the generation of an SMI. Maximum flexibility may be achieved in the ability to program virtually any event as primary or secondary activity to suit power management goals. Once secondary events 403 or IRQ block 408 triggers secondary activity, the S/A signal 406 may be generated.

Figure 5:
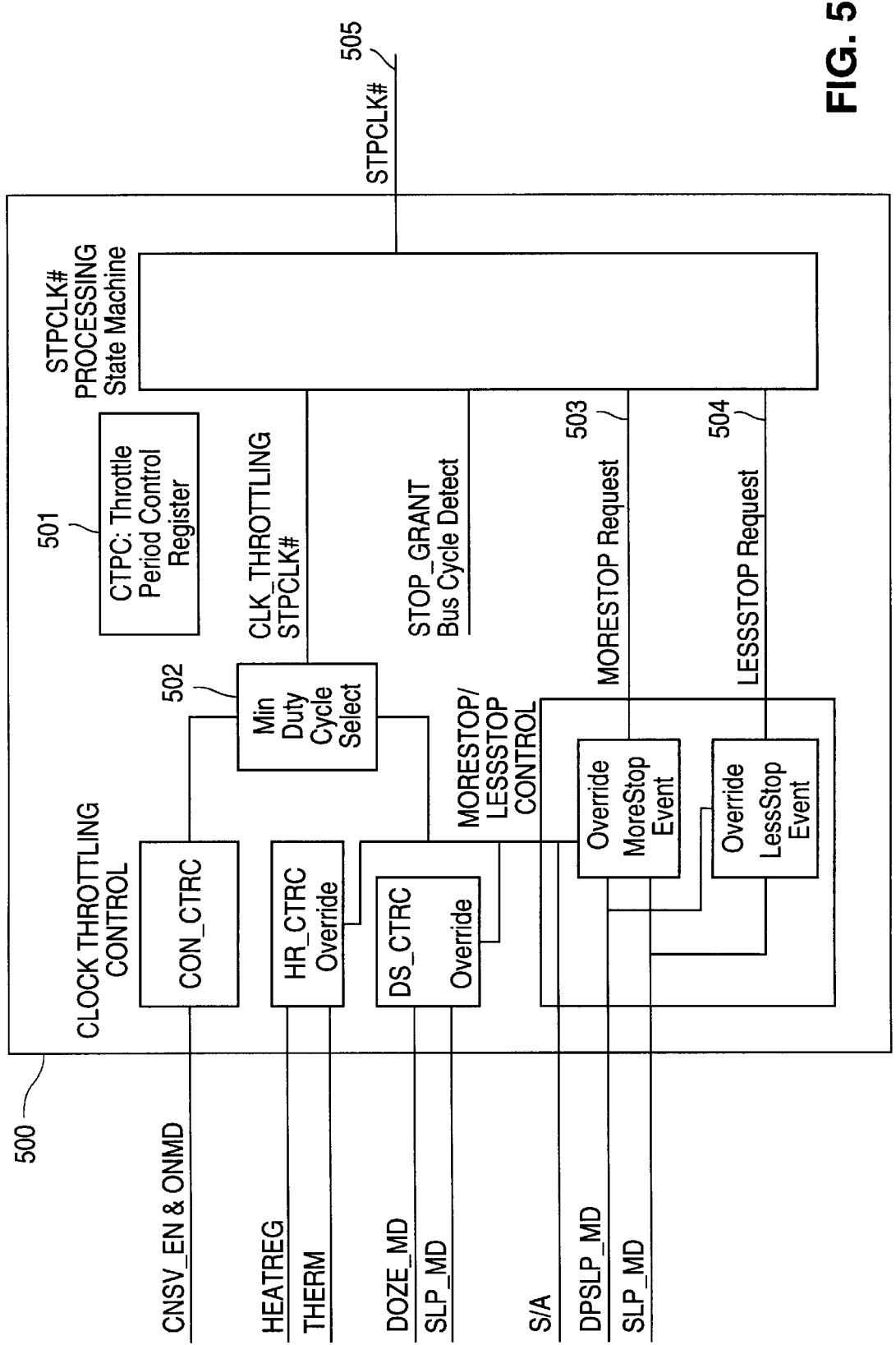
FIG. 5 is a block diagram illustrating throttling of the clock stopping signal and MORESTOP and LESSSTOP control.

In FIG. 5, stop clock control block 500 contains elements controlling the generation of STPCLK 505. Throttling period control register CTPC 501 stores a value corresponding to a throttling period. A throttling period may be a time interval during which STPCLK 505 may be applied to the processor according to a duty cycle the value of which may be programmed in and read from a register. Duty cycle select block 502 controls the duty cycle of STPCLK 505 when it is applied during a throttling period.

MORESTOP request 503 and LESSSTOP request 504 may be input from applications or operating system software to indicate to the CPU that a higher or lower level of power conservation is desired. LESSSTOP request 405 may alter the level of sleep of the CPU by altering the duty cycle of the clock throttling circuit while the CPU clock continues to run. MORESTOP request 503 may control whether the CPU clock is stopped entirely during a throttling period or whenever STPCLK is asserted.

Unlike MORESTOP requests 503, the CPU clock may remain running during LESSSTOP requests 504. With the CPU clock running, the system may return instantly to processing when STPCLK 505 is removed. MORESTOP request 503 stops the CPU clock and upon removal of STPCLK, a latency period of up to 1 ms may be necessary to control CPU clock resynchronization and stabilization of the CPU PLL.

While the preferred embodiment and various alternative embodiments of the invention have been disclosed and described in detail herein, it may be apparent to those skilled in the art that various changes in form and detail may be made without departing from the spirit and scope of the invention. For example, while the prefetch detect circuit illustrated herein as receiving a line of addresses thirty-two bytes long, the present invention could be practiced on systems with greater or lesser addressing capability. The use of fixed software interrupts while encompassing those software interrupts known to be indicative of inactivity, could be practiced on any fixed interrupt number. Moreover, although the preferred embodiment is drawn to an integrated circuit, the present invention may be applied to a series of integrated circuits, or in other circuitry within a computer system without departing from the spirit and scope of the present invention.

We claim:

1. A circuit initiating power conservation in a system upon recognition of system inactivity, the circuit comprising:

a decoder receiving a first signal and translating the first signal into a first fixed software interrupt address indicative of system inactivity; and a comparison block coupled to the decoder, the comparison block receiving the first fixed software interrupt address and comparing the first fixed software interrupt address to a value programmed in a register, the comparison block generating a second signal when the first fixed software interrupt address matches the value, such that the second signal results in inhibition of a system clock and power conservation.

2. A power conservation circuit comprising:

a nap triggering circuit receiving a first signal and generating a second signal when the first signal is indicative of system inactivity;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

3. The power conservation circuit of claim 2 wherein said nap triggering circuit comprises:

a decoder receiving the first signal and translating the first signal into a first fixed software interrupt address; and a register for storing a second fixed software interrupt address;

a comparison block coupled to the register and to the decoder, the comparison block receiving and comparing the first fixed software interrupt address with the second fixed software interrupt address and generating the second signal if the first fixed software interrupt address matches the second fixed software interrupt address.

4. The power conservation circuit of claim 2 wherein the prefetch detect circuit comprises:

a register for receiving and storing a prior address;

a decoder receiving the first signal and translating the first signal into a present address;

a comparison block coupled to the register and to the decoder, the comparison block receiving and comparing the previous address with the present address, the comparison block generating the third signal if the previous address differs from the present address by a value of one.

5. A circuit determining whether a present address received is prefetched information, the circuit comprising:

a decoder receiving the present address and detecting whether the present address is a fixed software interrupt address;

a register for receiving and storing a prefetched address;

an adder coupled to the register, the adder adding a 1 to the prefetched address and outputting an added value; and a comparison block coupled to the adder and to the decoder, the comparison block receiving and comparing the added value with the present address, the comparison block generating a first signal if the added value matches the present address.

6. In a system controller receiving a present address and generating a clock stopping signal to conserve power, a circuit determining whether the present address is part of a prefetch, the circuit comprising:

a first register receiving and storing the present address;

a second register receiving and storing a prefetched address; and a comparison block coupled to the first register and the second register, the comparison block receiving the present address and the prefetched address and detecting whether the present address differs from the prefetched address by a value of one.

7. A method of conserving power in a computer system by controlling the application of a clock stopping signal in a system controller, said method comprising the steps of:

detecting a nap triggering event in a computer system and activating a nap signal by storing a value in a register corresponding to a fixed software interrupt address, decoding a present address, and generating a nap signal if the present address matches the value stored in said register and the present address is not part of a prefetch;

inhibiting the nap signal during a processor prefetch cycle, unless a present address is a first address in a prefetch cycle, detecting primary and secondary activity and inhibiting the nap signal if said primary and secondary activity are present, and applying the clock stopping signal during a throttling period according to a programmable duty cycle while the nap signal is active.

8. The method of claim 7 wherein said step of inhibiting the nap signal during a processor prefetch cycle further comprises the steps of:

storing a value in a register corresponding to a previous address, decoding a present address, and generating a prefetch detect signal if the present address differs from the previous address by a value of one.

9. The method of claim 7 wherein said step of detecting primary and secondary activity and inhibiting said nap signal if said primary and secondary activity are present further comprises the steps of:

storing at least one value in a first at least one register corresponding to primary activity, storing at least one value in a second at least one register corresponding to secondary activity, detecting primary activity if said first at least one register value matches present activity, detecting secondary activity if said second at least one register value matches present activity, inhibiting said nap signal if primary activity is detected, and inhibiting said nap signal if secondary activity is detected.

10. The method of claim 9 wherein said step of detecting primary activity if said first at least one register value matched present activity further comprises:

storing a value in said first at least one register, said value comprising at least one of an address, and a hardware signal.

11. The method of claim 9 wherein said step of detecting secondary activity if said first at least one register value matched present activity further comprises:

storing a value in said first at least one register, said value comprising at least one of an address, and a hardware signal.

12. The method of claim 7 wherein said step of inhibiting said nap signal if primary activity is detected further comprises the steps of:

communicating a signal to a throttling circuit for controlling the application of a clock stopping signal, said signal for terminating the application of said clock stopping signal in a present power conservation mode.

13. The method of claim 7 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

14. The method of claim 13 wherein said step of communicating a signal to a throttling circuit further comprises the step of:

restoring said application of said clock stopping signal in a previous power conservation mode if said secondary activity is no longer detected.

15. The method of claim 7 further comprising the steps of:

reading a programmable timeout value stored in a register, comparing the programmable timeout value with a NAP counter output, and generating a timeout signal if the programmable timeout value equals the NAP counter output.

16. A method of conserving power in a computer system by controlling the application of a clock stopping signal in a system controller, said method comprising the steps of:

detecting a nap triggering event in a computer system and activating a nap signal, inhibiting the nap signal during a processor prefetch cycle, unless a present address is a first address in a prefetch cycle by storing a value in a register corresponding to a previous address, decoding a present address, and generating a prefetch detect signal if the present address differs from the previous address by a value of one;

detecting primary and secondary activity and inhibiting the nap signal if said primary and secondary activity are present, and applying the clock stopping signal during a throttling period according to a programmable duty cycle while the nap signal is active.

17. The method of claim 16 wherein said step of detecting a nap triggering event in a computer system and activating a nap signal comprises the steps of:

storing a value in a register corresponding to a fixed software interrupt address;

decoding a present address; and generating a nap signal if the present address matches the value stored in said register and the present address is not part of a prefetch.

18. The method of claim 16 wherein said step of detecting primary and secondary activity and inhibiting said nap signal if said primary and secondary activity are present further comprises the steps of:

storing at least one value in a first at least one register corresponding to primary activity, storing at least one value in a second at least one register corresponding to secondary activity, detecting primary activity if said first at least one register value matches present activity, detecting secondary activity if said second at least one register value matches present activity, inhibiting said nap signal if primary activity is detected, and inhibiting said nap signal if secondary activity is detected.

19. The method of claim 18 wherein said step of detecting primary activity if said first at least one register value matched present activity further comprises:

storing a value in said first at least one register, said value comprising at least one of an address, and a hardware signal.

20. The method of claim 18 wherein said step of detecting secondary activity if said first at least one register value matched present activity further comprises:

storing a value in said first at least one register, said value comprising at least one of an address, and a hardware signal.

21. The method of claim 16 wherein said step of inhibiting said nap signal if primary activity is detected further comprises the steps of:

communicating a signal to a throttling circuit for controlling the application of a clock stopping signal, said signal for terminating the application of said clock stopping signal in a present power conservation mode.

22. The method of claim 16 wherein said step of inhibiting said nap signal if secondary activity is detected further comprises the step of:

communicating a signal to a throttling circuit for controlling the application of a clock stopping signal, said signal for suspending said application of said clock stopping signal in a present power conservation mode.

23. The method of claim 22 wherein said step of communicating a signal to a throttling circuit further comprises the step of:

restoring said application of said clock stopping signal in a previous power conservation mode if said secondary activity is no longer detected.

24. The method of claim 16 further comprising the steps of:

reading a programmable timeout value stored in a register, comparing the programmable timeout value with a NAP counter output, and generating a timeout signal if the programmable timeout value equals the NAP counter output.

25. A power conservation circuit comprising:

a nap triggering circuit receiving a first signal and generating a second signal when the first signal is indicative of system inactivity, the nap triggering circuit comprising a decoder receiving the first signal and translating the first signal into a first fixed software interrupt address, a register for storing a second fixed software interrupt address, and a comparison block coupled to the register and to the decoder, the comparison block receiving and comparing the first fixed software interrupt address with the second fixed software interrupt address and generating the second signal if the first fixed software interrupt address matches the second fixed software interrupt address;

a prefetch detect circuit receiving the first signal and generating a third signal when the first signal is the product of a prefetch cycle; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

26. A power conservation circuit comprising:

a nap triggering circuit receiving a first signal and generating a second signal when the first signal is indicative of system inactivity;

a prefetch detect circuit receiving the first signal and generating a third signal when the first signal is the product of a prefetch cycle, the prefetch detect circuit comprising a register for receiving and storing a prior address, a decoder receiving the first signal and translating the first signal into a present address, a comparison block coupled to the register and to the decoder, the comparison block receiving and comparing the previous address with the present address, the comparison block generating the third signal if the previous address differs from the present address by a value of one; and a throttling circuit coupled to the nap triggering circuit and to the prefetch detect circuit, the throttling circuit generating a clock stopping signal upon receipt of the second signal but not generating a clock stopping signal upon receipt of the third signal, such that communication of the clock stopping signal to a system clock results in inhibition of the system clock and power conservation.

\* \* \* \* \*